May 22, 1956  J. L. ROBERTSON  2,746,553
AIRCRAFT LATERAL CONTROL SYSTEMS
Filed April 13, 1953  2 Sheets-Sheet 1
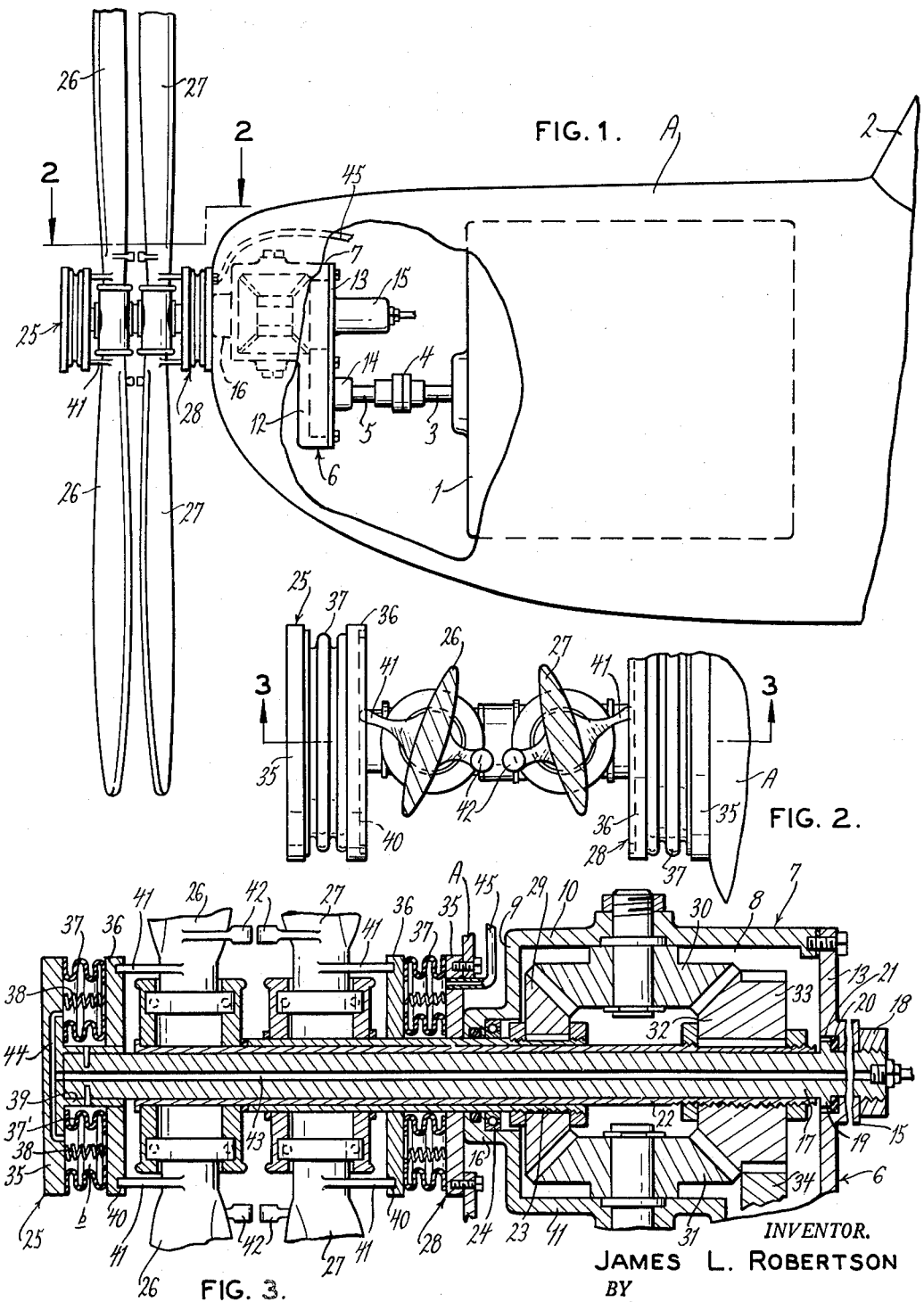
INVENTOR.
JAMES L. ROBERTSON
BY
ATTORNEY

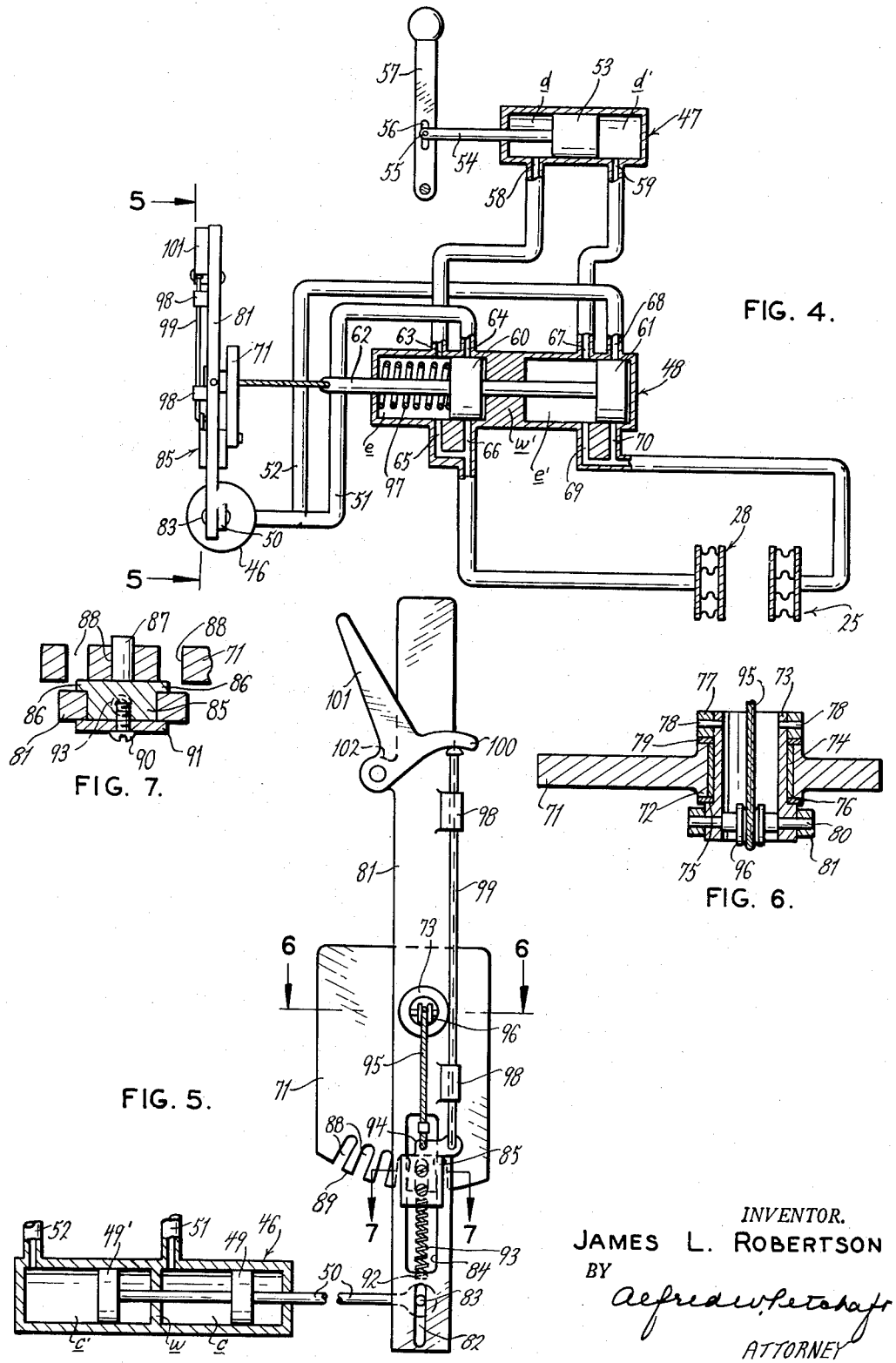

United States Patent Office 2,746,553
Patented May 22, 1956

2,746,553
AIRCRAFT LATERAL CONTROL SYSTEMS

James L. Robertson, Clayton, Mo., assignor to Robertson Development Corporation, St. Charles, Mo., a corporation of Missouri Application April 13, 1953, Serial No. 348,263

3 Claims. (Cl. 170—135.24)

This invention relates in general to certain new and useful improvements in aircraft and, more particularly, to an aircraft control system for effecting banking and turning.

It is the primary object of the present invention to provide a new and improved system for lateral control of aircraft which is aerodynamically efficient and is effective even in very slow flying high-lift type aircraft.

It is another object of the present invention to provide a lateral control system for aircraft which is positive and direct in its effect and does not depend for operation upon the use of ailerons and similar airfoil surfaces.

With the above and other objects in view, my invention resides in the novel features of form, construction, arrangement, and combination of parts presently described and pointed out in the claims.

In the accompanying drawings (two sheets)—

Figure 1 is a fragmentary side elevational view of the forward end of an airplane constructed in accordance with and embodying the present invention;

Figure 2 is a fragmentary sectional view taken along line 2—2 of Figure 1;

Figure 3 is a fragmentary sectional view taken along line 3—3 of Figure 2;

Figure 4 is a diagrammatic view of the lateral control system embodying the present invention;

Figure 5 is a fragmentary sectional view taken along line 5—5 of Figure 4; and

Figures 6 and 7 are fragmentary sectional views taken along lines 6—6 and 7—7, respectively, of Figure 5.

Referring now in more detail and by reference characters to the drawings, which illustrate a preferred embodiment of the present invention, A designates an aircraft fuselage having a conventional engine 1 of any suitable type mounted preferably forward of the cockpit 2 and having a forwardly extending drive shaft 3 connected by a coupling 4 to the rearwardly extending input shaft 5 of a transmission unit 6 which, in turn, consists of a hollow housing 7 rigidly mounted in the nose of the fuselage A.

The housing 7 integrally includes an upper compartment or chamber 8 having forward, top, and bottom walls 9, 10, 11. Adjacent its rearward end, the chamber 8 is enlarged downwardly in the provision of a depending offset 12 and is provided with a cover plate 13 having a rearwardly extending bearing 14 for accommodating the input shaft 5. The upper portion of the wall is further provided with a rearwardly extending, relatively long, spindle-supporting boss 15 aligned concentrically with the chamber 8 and with a shaft bearing 16 formed in the front wall 9. Rigidly mounted in and extending forwardly from the boss 15 is a stationary spindle 17 threaded at its rearward end for receiving a securement nut 18 and integrally provided with a diametrally enlarged shoulder 19 for tight seated engagement against a packing washer 20 fitted within a gland-forming recess 21. Rotatably mounted upon the stationary spindle 17 are two respectively concentric and nested driving sleeves or tubular shafts 22, 23, which are respectively lubricated by oil with which the chamber 8 is substantially filled and are rotatably supported by a conventional ball bearing assembly 24 forming a part of the shaft bearing 16. The stationary spindle 17 and its associated tubular shafts 22, 23, extend forwardly through the bearing 16, substantially as shown in Figure 3, and at their outer ends are respectively provided with an outer pitch control unit 25, an outer adjustable pitch propeller 26, and an inner adjustable pitch propeller 27. Rigidly mounted upon the outer face of the front wall 9, concentrically about the outer tubular shaft 23, is an inner pitch control unit 28. Keyed to the interior end of the shaft 23 is a bevel gear 29 which meshes with planetary gears 30, 31, journaled, respectively, on the top and bottom walls 10, 11, and meshing, in turn, with a main bevel gear 32 keyed or otherwise rigidly mounted upon the shaft 22 and having a rearward spur gear portion 33 for meshing engagement with a spur gear 34 pinned or otherwise operatively mounted upon the inner end of the input shaft 5.

Each of the pitch control units 25, 28, include a stationary back-plate 35 and a moving or actuator plate 36 connected by concentrically mounted bellows 37, 37', forming a doughnut-shaped expansion chamber $b$ annularly around the spindle 17. Operatively mounted within each chamber $b$ between the back-plate 35 and actuator plate 36 is a plurality of internal tensioning springs 38 for normally biasing the actuator plate 36 in the direction of the stationary back-plate 35. As will be seen by reference to Figure 3, the back-plate 35 is integrally provided with an axially extending sleeve 39 upon which the moving plate 36 is shiftably supported. Furthermore, the moving or actuator plate 36 is provided in its outwardly presented face with an annular channel or groove 40 for rotatably receiving the inserted ends of rock arms 41, extending radially from the rotatable blades of the propellers 26, 27, respectively. It should be noted in this connection that the propellers 26, 27, are conventionally provided with counter-balancing weights 42 for offsetting the mass of the arms 41 so that the latter will not produce any dynamic imbalance when the propellers 26, 27, are rotating at high speed.

The outer pitch control unit 25 is supplied with hydraulic fluid through a duct 43 bored axially through the stationary spindle 17 and communicating to the chamber $b$ through lateral ducts 44. Similarly, the inner pitch control unit 28 is provided with hydraulic fluid through a supply line 45 rigidly fixed in and extending through the back-plate 35 thereof and opening directly into the chamber $b$ of such unit 28.

The pitch control units 25, 28, are operated by a control system diagrammatically shown in Figure 4 and comprising a pitch control cylinder 46, a lateral control cylinder 47 and a changeover valve 48. The pitch control cylinder 46 is divided by a wall $w$ into two chambers $c$, $c'$, each containing single-acting pistons 49, 49', mounted on an outwardly extending piston rod 50 and respectively having discharge ports 51, 52. The lateral control cylinder 47 comprises a double-acting piston 53 operatively located medially within the cylinder 47 and dividing it into opposed chambers $d$, $d'$, and having an outwardly extending piston rod 54 provided at its external end with a pin 55 operatively disposed in a slot 56 of a control lever or so-called "stick" 57 rockably mounted in a conventional manner within the cockpit 2. The chambers $c$, $c'$, are respectively provided with discharge openings or ports 58, 59.

The changeover valve 48 is divided by a wall $w'$ into two separate chambers $e$, $e'$, containing piston-like valve plugs 60, 61, respectively mounted therein and operatively connected by a single valve rod 62 which extends slidably through the wall $w'$ and outwardly from the changeover valve 48. The chamber $e$ is provided with two spaced inlet ports 63, 64, and two similarly spaced outlet ports 65, 66. Similarly, the other chamber $e'$ is provided with two spaced inlet ports 67, 68, and two spaced outlet ports 69, 70. The inlet port 63 is aligned with the outlet port 65, the inlet port 64 is aligned with the outlet port 66, the inlet port 67 is aligned with the outlet port 69, and the inlet port 68 is aligned with the outlet port 70. Such inlet and outlet ports, are furthermore, arranged so that when the valve rod 62 is shifted inwardly, the valve plug 60 will close communication between the inlet port 64 and outlet port 66 and, simultaneously, the valve plug 61 will close communication between the inlet port 68 and the outlet port 70. In this position, the inlet port 63 and outlet port 65 will be in communication with each other and the inlet port 67 and outlet port 69 will be in communication with each other. Contrariwise, when the valve plugs 60, 61, are shifted to the other position, the opposite condition will prevail and the inlet port 63 and outlet port 65 will be closed, whereas communication will be permitted between the inlet port 64 and outlet port 66. Similarly, communication between the inlet port 67 and the outlet port 69 will be closed and the inlet port 68 will be in communication with the outlet port 70.

As will be seen by reference to Figure 4, both outlet ports 65, 66, are connected to the pitch control unit 28 and both outlet ports 69, 70, are connected to the pitch control unit 25. The inlet port 63 is connected to the outlet port 58 of the lateral control system 47 and the inlet port 67 is correspondingly connected to the outlet port 59 thereof. The inlet ports 64, 68, are respectively connected to the outlet ports 51, 52, of the pitch control cylinder 46.

Mounted in any convenient location within the cockpit 2 is a ratchet plate 71 having a bearing 72 for rotatably receiving a tubular sleeve 73 operatively supported therein by means of a self-lubricating (so-called oilite) bushing 74. At one end, the sleeve 73 is diametrally enlarged in the provision of a bearing shoulder 75, which bears against a self-lubricating (so-called oilite) washer 76. At its other end, the sleeve 73 is provided with a securement collar 77 rigidly fastened thereto by means of pins 78 and bearing against a self lubricating (so-called oilite) washer 79. Rigidly attached to the diametrally enlarged end of the sleeve 73, by means of a pin 80, is an actuating handle 81 extending upwardly and downwardly on opposite sides of the sleeve 73 and being provided in its lower end with a short longitudinally extending slot 82 for receiving a pin 83 fixed in the rear end of the piston rod 50 associated with the feathering control cylinder 46.

Between the slot 82 and the pivot-forming sleeve 73, the lower portion of the handle 81 is provided with a relatively large longitudinally extending slot 84 for slidably supporting a pawl-block 85 integrally provided with marginal flanges 86 and an outwardly projecting locking stud 87 sized and positioned for optional engagement in any one of a plurality of relatively long latch-forming slots 88 formed in the downwardly presented arcuate lower margin 89 of the plate 71, the slots 88 being substantially radial with respect to the center line of the sleeve 73. Secured by means of screws 90 upon the opposite face of the pawl-block 85 is a face plate 91 adapted to hold the pawl-block securely within the slot 84. The slot 84 is, furthermore, provided at its lower end with a drilled socket or recess 92 for receiving the lower end of a compression spring 93, which is, in turn, seated at its upper end in the lower face of the pawl-block 85 for normally biasing the latter upwardly so that the stud 87 will normally be seated within one of the slots 88 for locking the handle 81 against swinging movement. Upon its upper face, the pawl-block 85 is integrally provided with a transversely apertured boss 94 for looped engagement with the lower end of the flexible braided steel cable 95 which extends upwardly therefrom and is trained around a small pulley 96 rotatably mounted interiorly of the tubular sleeve 73 adjacent the outer or handle supporting end thereof. The cable 95 extends axially through the sleeve 73 and outwardly therefrom for connection with the end of the piston rod 61 of the changeover valve 48. As will be noted by reference to Figure 4, the changeover valve 48 is internally provided with a compression spring 97 which is mounted encirclingly around the valve rod 61 and bears against the valve plug 60 for normally biasing the latter against the intermediate wall w'. In other words, the spring 97 normally holds the valve plugs 60, 61, of the changeover valve 48 in such position that the flow of hydraulic fluid is blocked off between the ports 64, 66, and 68, 70, respectively. In this connection, it should be also noted that the length of the cable 95 is such that the cable will be taut when the valve plugs 60, 61, are in such position and the stud 87 is in locked position within any one of the slots 88. Since the pulley 96 is located substantially at the center line of the sleeve 73 and rotates therewith and the horizontal run of the cable 95 is approximately coaxial with the sleeve 73, swinging movement of the handle 81 will not appreciably effect the position of the valve plugs 60, 61.

Shiftably mounted in a series of axially aligned slide bearings 98 and extending lengthwise along the handle 81 is a push rod 99 attached at its lower end to the pawl-block 85 and at its upper end bears against a cam finger 100 formed integrally on and projecting from a bell-crank type handle release 101 pivotally mounted upon a rearwardly projecting ear 102 formed integrally upon and adjacent to the upper end of the handle 81.

In flight, the input shaft 5 of the transmission 6 is conventionally driven by the engine 1 and the rotary movement thereof is transmitted through the spur gear 34 and the bevel gearing 29, 30, 31, 32, to the shafts 22, 23, so that the two propellers 26, 27, will counter-rotate at identical speeds. During take-off, the pitch of the propellers is set to a relatively sharp angle by swinging the handle release 101 inwardly, thereby shifting the push rod 99 downwardly and slide the pawl-block downwardly against the bias of the spring 93 to move the stud 87 downwardly out of engagement with the particular slot 91 in which it happens to be seated. The handle 81 is thereby released for swinging movement. As the pawl-block 85 moves downwardly to effect release of the handle 81, the cable 95 is simultaneously pulled downwardly over and around the pulley 96, pulling the valve rod 62 outwardly and shifting the valve plugs 60, 61, into arrangement with the ports 63, 65, and 67, 69, respectively, so that flow of hydraulic fluid between these ports is blocked off and instead hydraulic fluid will flow between the ports 64, 66, and 68, 70, so that hydraulic fluid from the pitch control cylinder 46 will flow simultaneously and over equal pressure into the pitch control units 25, 28, from the two chambers c, c', respectively, of the cylinder 46. Thus, as the hendle 81 is swung rearwardly, the lower end thereof will correspondingly swing forwardly, pushing the piston rod 50 inwardly and forcing hydraulic fluid into the control units 25, 28. As the bellows 37, 37', thereof expand, the actuator plate 36 will shift away from the back-plate 35, applying mechanical pressure against the arms 41 and swinging the blades of the propellers 26, 27, to any desired angle within the limits of movement thereof corresponding to the amount of swinging movement imparted to the handle 81. When the propellers have been set to the desired pitch, the handle release 101 may be permitted to move back to initial position so that the push rod 99 and the pawl-block 85 will slide upwardly, thereupon, the stud 87 will become seated in one of the slots 88. Simultaneously, the cable 95, the valve rod 62 and the valve plugs 60, 61, associated therewith, will shift back to initial position, blocking further communication between the cylinder 48 and the control units 25, 28. Thereupon, communication is established between the control units 25, 28, and the chambers d, d', respectively, of the cylinder 47 so that as the airplane continues to fly with its propellers set at the selected pitch, the handle or "stick" 57 can be manipulated by the pilot shifting the piston 52 to one side or the other as it is necessary to bank or turn.

The shifting movement of the piston 53 will alternatively force oil into one and withdraw oil from the other of the control units 25, 28, thereby causing the propellers to feather differentially. In other words, responsive to shifting movement of the stick 57 one propeller will increase its pitch and the other propeller will decrease its pitch by a corresponding amount, starting from the selected pitch at which the propellers then happened to be set. This differential feathering will produce greater torque in one propeller and less torque in the other propeller. The net effect of which will be to impart a turning moment to the aircraft A, causing it to bank and turn either to the right or the left as desired. As long as the handle 81 remains untouched, the stick 57 will supply constant lateral control during flight. On the other hand, whenever it is desirable or necessary to change the pitch of the propellers 26, 27, the handle 81 may be manipulated as above described and, by reason of the sleeve of the changeover valve 48, will, in effect, take control away from the stick 57 while the pitch of the propellers 26, 27, is being changed. Although it is usual practice to change the pitch of the propellers only during straight flying, that is to say when the stick 57 is in central or neutral position, nevertheless the present system of control is not limited in this respect. If, for any conceivable reason or emergency, the pilot desires to change the pitch of the propellers while maintaining some particular posture of bank and turn, the stick 57 could be held in whatever position might be necessary to effect the desired degree of lateral control and the handle 81 thereupon manipulated. The handle 81, through intervention of the changeover valve 48, will immediately take control away from the stick 57 while the pitch of the propellers 26, 27, is being changed and, as soon as the pitch-change is completed, control will automatically be returned to the stick 57. Since the propellers are already differentially feathered by virtue of the position of the stick 57, the pitch modification will be superimposed upon the degree of differential feathering which has been effected by the stick 57. If, for example, the propellers 26, 27, have initially been set to a pitch of minus 4° and plus 4°, respectively, and, during flight, the stick 57 is shifted so that the propeller 26 is shifted to produce a lateral control feathering of 3° so that the propeller 26 assumes a pitch of plus 7°, the propeller 27 will correspondingly assume a pitch of minus 1° so that although the propellers are differentially feathered the net pitch difference of 8° will be observed. If, while maintaining this relative lateral control position, it becomes necessary to change the pitch by an additional 2°, the handle 81 can be manipulated, as above described, so that the pitch of the propeller 26 will become plus 9° and the pitch of the propeller 27 will become minus 3°. Consequently, whenever the stick 57 is returned to neutral position, thereby, in effect, nullifying the lateral control feathering of 3°, the propeller 26 will return to a pitch of plus 6° and the other propeller 27 will return to a pitch of minus 6°.

It should be noted that in the lateral control system of the present invention, the propeller control units 25, 28, are, at all times, independently controlled by hydraulic fluid from different chambers of the cylinders 46 or 47, whichever may be operatively connected thereto at the moment. Consequently, the relative amounts of feathering and pitch control will be constantly and precisely inter-related so that when the lateral control cylinder 47 is operative, the same degree of feathering will be imposed positively upon both propellers, and since the propellers are counter-related, positive pitch will be additive in the case of one propeller and correspondingly subtractive in the case of the other propeller. Contrariwise, when the feathering control cylinder 46 is operative, the amount of pitch variation applied positively to one propeller will simultaneously be applied negatively to the other propeller so that its effect will be cumulative with respect to both.

It should be understood that changes and modifications in the form, construction, arrangement, and combination of the several parts of the aircraft lateral control system may be made and substituted for those herein shown and described without departing from the nature and principle of my invention.

Having thus described my invention, what I claim and desire to secure by Letters Patent is:

1. A lateral control system for aircraft comprising two variable-pitch propellers, means for independently rotating each propeller, pitch control means operatively associated with each propeller, a first hydraulic pump having two outlets and being adapted for simultaneously creating pressure at one outlet and suction at the other, a second hydraulic pump having two outlets and being adapted for simultaneously creating the same pressure or suction at both outlets, and a changeover valve interposed between the hydraulic pumps and the pitch control means for alternatively connecting the outlets of one or the other of said pumps to the respective pitch control means.

2. A lateral control system for aircraft comprising two variable-pitch propellers, means for independently rotating each propeller, pitch control means operatively associated with each propeller, a first hydraulic pump having two outlets and being adapted for simultaneously creating pressure at one outlet and suction at the other, a second hydraulic pump having two outlets and being adapted for simultaneously creating the same pressure or suction at both outlets, a changeover valve interposed between the hydraulic pumps and the pitch control means for alternatively connecting the outlets of one or the other of said pumps to the respective pitch control means, a handle for operating the second hydraulic pump, locking means for holding the handle in any one of several selected positions, and means operable responsive to unlocking movement of the locking means for actuating the changeover valve.

3. A lateral control system for aircraft comprising two variable-pitch propellers, means for independently rotating each propeller, pitch control means operatively associated with each propeller, a first hydraulic pump having two outlets and being adapted for simultaneously creating pressure at one outlet and suction at the other, a second hydraulic pump having two outlets and being adapted for simultaneously creating the same pressure or suction at both outlets, a changeover valve interposed between the hydraulic pumps and the pitch control means for alternatively connecting the outlets of one or the other of said pumps to the respective pitch control means, a handle for operating the second hydraulic pump, a quill for rockably supporting the handle, locking means for holding the handle in any one of several selected positions, and means operable responsive to unlocking movement of the locking means for actuating the changeover valve, said last-named means including a cable extending axially through the quill so that it will not be operatively affected by rocking movement of the handle.

References Cited in the file of this patent
UNITED STATES PATENTS

| | | |
|---|---|---|
| 2,280,654 | Mader | Apr. 21, 1942 |
| 2,354,422 | Roby | July 25, 1944 |
| 2,394,846 | Cox | Feb. 12, 1946 |
| 2,505,759 | Faulkner | May 2, 1950 |
| 2,521,806 | Roman | Sept. 12, 1950 |
| 2,540,543 | Neville | Feb. 6, 1951 |
| 2,549,108 | Martin | Apr. 17, 1951 |
| 2,573,943 | Ziskal | Nov. 6, 1951 |
| 2,643,833 | Ambroise | June 30, 1953 |